(12) United States Patent
Klieman

(10) Patent No.: US 8,930,205 B1
(45) Date of Patent: Jan. 6, 2015

(54) METHOD AND SYSTEM FOR PERSONALIZED HEALTHCARE RELATED EXPENSE INVESTMENT PLANNING

(75) Inventor: Michael S. Klieman, Belmont, CA (US)

(73) Assignee: Intuit Inc., Mountain View, CA (US)

( * ) Notice: Subject to any disclaimer, the term of this patent is extended or adjusted under 35 U.S.C. 154(b) by 1846 days.

(21) Appl. No.: 11/740,232

(22) Filed: Apr. 25, 2007

(51) Int. Cl.
*G06Q 50/00* (2012.01)

(52) U.S. Cl.
USPC ........................................ 705/2; 705/3; 705/4

(58) Field of Classification Search
USPC ..................... 705/2–4; 364/413.01
See application file for complete search history.

(56) References Cited

U.S. PATENT DOCUMENTS

| | | | | |
|---|---|---|---|---|
| 5,136,502 A | * | 8/1992 | Van Remortel et al. | 705/2 |
| 8,145,500 B2 | * | 3/2012 | Matisonn et al. | 705/2 |
| 2005/0102172 A1 | * | 5/2005 | Sirmans, Jr. | 705/4 |
| 2008/0010086 A1 | * | 1/2008 | Skelly et al. | 705/2 |
| 2008/0040151 A1 | * | 2/2008 | Moore | 705/2 |

* cited by examiner

*Primary Examiner* — Hiep V Nguyen
*Assistant Examiner* — Teresa Woods
(74) *Attorney, Agent, or Firm* — Hawley Troxell Ennis & Hawley LLP; Philip McKay

(57) ABSTRACT

A method and system for personalized healthcare related expense investment planning includes a process for personalized healthcare related expense investment planning whereby, in one embodiment, a timeframe is defined during which the investor/user wishes to provide funds to cover healthcare expenses. In one embodiment, the user's healthcare services utilization for the defined timeframe is then projected/predicted using a personalized healthcare service utilization model. In one embodiment, the cost of the user's projected healthcare service utilization for the defined timeframe is then calculated/predicted based on the user taking part in one or more defined healthcare programs. In one embodiment, the calculated cost of the user's projected healthcare service utilization for the defined timeframe is then used to select an investment plan and/or strategy to provide healthcare expense funds for the defined timeframe.

27 Claims, 2 Drawing Sheets

METHOD AND SYSTEM FOR PERSONALIZED HEALTHCARE RELATED EXPENSE INVESTMENT PLANNING

BACKGROUND

With the virtual disappearance of traditional company sponsored pension plans, the majority of the current workforce realizes that they are largely responsible for planning their own retirement income. In light of this fact, retirement investment plans, and investment plans in general, are enjoying all time high participation levels in the United States. In addition, many people of all ages now regularly project, and often diligently plan out, their financial futures and expectations over shorter periods of time in much the same way that they plan out their retirement funding, i.e., using short and medium term financial predictions, investments and strategies, and by setting up accounts/assets dedicated to funding expected expenses and/or purchases.

Few would argue that planning and investing with an eye to the future, including retirement, is anything but intelligent, prudent and necessary. However, many currently available investment systems, mechanisms, plans and/or strategies often fail to carefully and accurately project healthcare costs over the investment period and/or the period of investment revenue reliance. The result of this current situation is that many well meaning, and well disciplined, investors discover that their carefully planned and cultivated investment revenue models collapse under seemingly endlessly rising "out-of-pocket" healthcare costs. Indeed current estimates of the out-of-pocket healthcare costs an average person will incur between age 65 and death are in the $300,000.00 to $500,000.00 range.

Inadequately planned for healthcare expenses can undermine investment and financial plans and strategies for any period of time, and for any investor of any age. However, the situation is particularly problematic when the investment planning is designed to include the retirement years and is meant to assure retirement income. This is true for several reasons including, but not limited to: the general deterioration of the body with age and the corresponding increase in medical procedures and medication use, which leads to a corresponding increase in individual healthcare costs and the necessity of the treatments/services causing the cost; the inability to recover from inadequate planning, i.e., typically a fixed income, at best; the lack of employer sponsored health insurance after retirement; and/or the inability to secure insurance at an older age and/or in a generally poorer state of health.

As a result of the situation described above, many investors who carefully and responsibly plan out their short term, medium term, and long term financial futures are currently basing their calculations on inaccurate/incomplete data. This often is a self-defeating exercise that, for many investors, will result in disappointment and disillusionment, at best, and, in many cases, in financial disaster.

SUMMARY

In accordance with one embodiment, a method and system for personalized healthcare related expense investment planning includes a process for personalized healthcare related expense investment planning whereby, in one embodiment, a timeframe of interest is defined during which the investor/user wishes to provide funds to cover healthcare expenses. In one embodiment, the user's healthcare service utilization for the defined timeframe is then projected/predicted using a personalized healthcare service utilization model. In one embodiment, the cost of the user's projected healthcare service utilization for the defined timeframe is then calculated/predicted based on the user taking part in one or more defined healthcare programs. In one embodiment, the calculated cost of the user's projected healthcare service utilization for the defined timeframe is then used to select an investment plan and/or strategy to provide healthcare expense funds for the defined timeframe.

In one embodiment, the timeframe is defined to be any period desired, such as, but limited to, months, years, decades, working lifetime, and/or lifetime. In one embodiment, the user's general background data is then obtained. In one embodiment, the general background data includes general/demographic data about the user such as, but not limited to: age; sex; occupation; residence; etc. and the recommended and/or average utilization of the average person of the user's background over the defined timeframe.

In one embodiment, the user's historical healthcare utilization data is also obtained. In one embodiment, the user's historical healthcare utilization data includes, but is not limited to: data representing the user's actual historical utilization of his or her healthcare program; whether or not the user actually takes advantage of regularly scheduled check ups and/or other preventative measures; whether the user follows and/or stays on any recommended routines, programs and medications; the user's family medical history; and/or the user's overall usage and historical attitude towards healthcare in general.

In one embodiment, the user's personal health profile data is also obtained. In one embodiment, the user's personal health profile data includes, but is not limited to: clinical data regarding existing disease, diagnoses, and/or treatment programs; the likely result of a diagnosed user condition based on the general disposition of the user to making use of available healthcare and/or following medical advice; trends/patterns in the user's specific clinical medical history and/or lab results; activities the user takes part in; the user's general activity level; and/or any other user health profile data that is indicative of health risks and/or pre-dispositions to disease and/or injury specific to the user.

In one embodiment, the user's general background data, the user's historical healthcare utilization data; the user's personal health profile data; and any other data desired and/or obtained is used to create a personalized projected healthcare service utilization model for the user that predicts the user's healthcare service utilization for the defined period.

In one embodiment, once the personalized projected healthcare service utilization model for the user creates the user's healthcare service utilization data for the defined period, the process for personalized healthcare related expense investment planning disclosed herein then uses the user's healthcare service utilization data to calculate the cost of the predicted healthcare service utilization over the defined timeframe under one or more healthcare plans and/or programs and/or insurance programs.

In one embodiment, once the cost of the predicted healthcare service utilization over the defined timeframe is determined, the process for personalized healthcare related expense investment planning then proceeds to find one or more investment plans and/or strategies that are likely yield a return equal to, or greater than, the calculated cost and/or yield the best results in light of the user's specific resources and needs. In one embodiment, the particular investment plans and/or programs are determined using well known investment formulas and mechanisms substantially identical to those used for any other investment scheme including traditional retirement plans.

Using the method and system for personalized healthcare related expense investment planning disclosed herein, a user can more accurately plan and execute an investment strategy that includes more realistically projected healthcare expenses. Consequently, using the method and system for personalized healthcare related expense investment planning disclosed herein, the user is more likely to realize the intended benefits of his or her planning and financial discipline.

As discussed in more detail below, using the below embodiments, with little or no modification and/or user input, there is considerable flexibility, adaptability, and opportunity for customization to meet the specific needs of various users under numerous circumstances.

Figure 1:
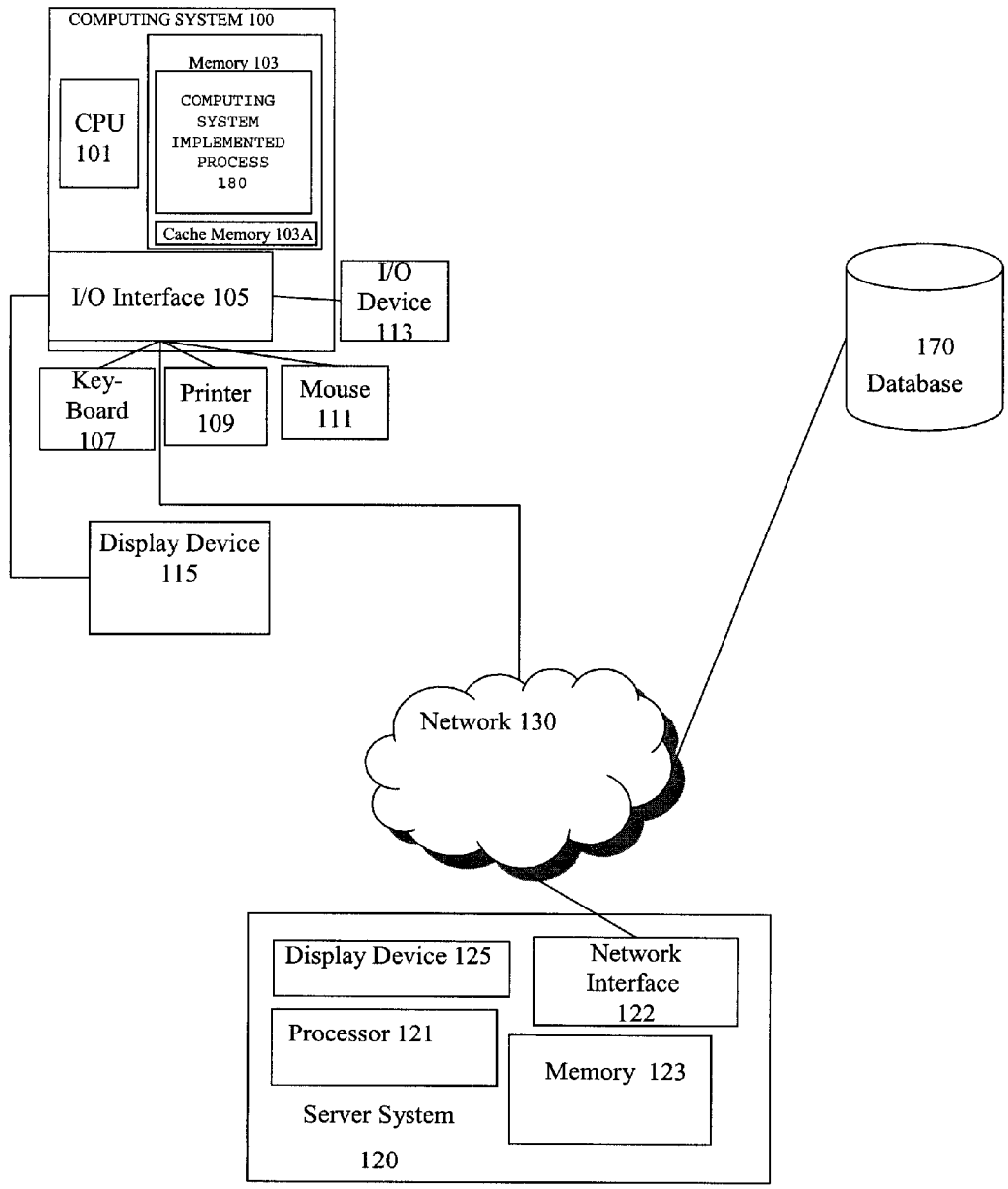
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for personalized healthcare related expense investment planning includes a process for personalized healthcare related expense investment planning whereby, in one embodiment, a timeframe of interest is defined during which the investor/user wishes to provide funds to cover healthcare expenses. In one embodiment, the user's healthcare service utilization for the defined timeframe is then projected/predicted using a personalized healthcare service utilization model. In one embodiment, the cost of the user's projected healthcare service utilization for the defined timeframe is then calculated/predicted based on the user taking part in one or more defined healthcare programs. In one embodiment, the calculated cost of the user's projected healthcare service utilization for the defined timeframe is then used to select an investment plan and/or strategy to provide healthcare expense funds for the defined timeframe.

In one embodiment, the timeframe is defined to be any period desired, such as, but limited to, months, years, decades, working lifetime, and/or lifetime. In one embodiment, the user's general background data is then obtained. In one embodiment, the general background data includes general/demographic data about the user such as, but not limited to: age; sex; occupation; residence; etc. and the recommended and/or average utilization of the average person of the user's background over the defined timeframe.

In one embodiment, the user's historical healthcare utilization data is also obtained. In one embodiment, the user's historical healthcare utilization data includes, but is not limited to: data representing the user's actual historical utilization of his or her healthcare program; whether or not the user actually takes advantage of regularly scheduled check ups and/or other preventative measures; whether the user follows and/or stays on any recommended routines, programs and medications; the user's family medical history; and/or the user's overall usage and historical attitude towards healthcare in general.

In one embodiment, the user's personal health profile data is also obtained. In one embodiment, the user's personal health profile data includes, but is not limited to: clinical data regarding existing disease, diagnoses, and/or treatment programs; the likely result of a diagnosed user condition based on the general disposition of the user to making use of available healthcare and/or following medical advice; trends/patterns in the user's specific clinical medical history and/or lab results; activities the user takes part in; the user's general activity level; and/or any other user health profile data that is indicative of health risks and/or pre-dispositions to disease and/or injury specific to the user.

In one embodiment, the user's general background data, the user's historical healthcare utilization data; the user's personal health profile data; and any other data desired and/or obtained is used to create a personalized projected healthcare service utilization model for the user that predicts the user's healthcare service utilization for the defined period.

In one embodiment, once the personalized projected healthcare service utilization model for the user creates the user's healthcare service utilization data for the defined period, the process for personalized healthcare related expense investment planning disclosed herein then uses the user's healthcare service utilization data to calculate the cost of the predicted healthcare service utilization over the defined timeframe under one or more healthcare plans and/or programs and/or insurance programs.

In one embodiment, once the cost of the predicted healthcare service utilization over the defined timeframe is determined, the process for personalized healthcare related expense investment planning then proceeds to find one or more investment plans and/or strategies that are likely yield a return equal to, or greater than, the calculated cost and/or yield the best results in light of the user's specific resources and needs. In one embodiment, the particular investment plans and/or programs are determined using well known investment formulas and mechanisms substantially identical to those used for any other investment scheme including traditional retirement plans.

Using the method and system for personalized healthcare related expense investment planning disclosed herein, a user can more accurately plan and execute an investment strategy that includes more realistically projected healthcare expenses. Consequently, using the method and system for personalized healthcare related expense investment planning disclosed herein, the user is more likely to realize the intended benefits of his or her planning and financial discipline.

As discussed in more detail below, using the below embodiments, with little or no modification and/or user input, there is considerable flexibility, adaptability, and opportunity for customization to meet the specific needs of various users under numerous circumstances.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether known at the time of filing or as developed later. Some embodiments are implemented in a mobile computing system running mobile operating systems such as Symbian® OS, Windows® Mobile, or any other operating system designed to generally manage operations on a mobile computing system, whether known at the time of filing or as developed later. As described more fully below, embodiments can be implemented on computing systems other than a conventional computing system such as, for example, a personal digital assistant, a cell phone, or other computing system capable of processing computer readable data, whether known at the time of filing or as developed later. Computing systems also include those in which one or more computing resources (hardware or software) are located remotely and accessed via network, such as a Local Area Network (LAN), Wide Area Network (WAN), a public network, such as the Internet, a private network, a combination of network types, a computing system bus, or other electronic medium in which data may be exchanged between one computing system and one or more other computing system(s), whether known at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, processes and/or systems described herein may make use of input provided to the computer device implementing a process and/or application, discussed herein, via user interface devices such as a keyboard, mouse, touchpad, or any other device capable of providing user input to a computing system or for translating user actions into computing system operations, whether known at the time of filing or as developed later.

Hardware System Architecture

FIG. 1 is a block diagram of exemplary hardware architecture for implementing one embodiment of a process for personalized healthcare related expense investment planning, such as exemplary processes for personalized healthcare related expense investment planning 200, discussed below, that includes: a computing system 100; a server system 120; and a database 170, all operatively connected by a network 130.

As seen in FIG. 1, computing system 100 typically includes a processor 101, an input/output (I/O) interface 105, and a memory system 103, including cache memory 103A. In one embodiment, computing system 100 includes all or part of one or more computing system implemented processes 180 such as, but not limited to, a computing system implemented personal financial management system, a computing system implemented personal accounting system, and/or a computing system implemented healthcare expense management system that is a used by, is a parent system for, is accessed by, and/or is otherwise associated with, a process for personalized healthcare related expense investment planning, such as exemplary processes for personalized healthcare related expense investment planning 200.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100, whether known at the time of filing or as later developed. As discussed in more detail below, in one embodiment, a process for personalized healthcare related expense investment planning, and/or one or more computing system implemented processes, can be loaded, in whole, or in part, into computing system 100 via I/O device 113, such as from a CD, DVD or floppy disk containing all, or part, of a process for personalized healthcare related expense investment planning and/or a computing system implemented process.

Also shown in FIG. 1 is database 170. In one embodiment, database 170 is a designated server system or computing system, or a designated potion of a server system or computing system, such as computing systems 100 and 120. In one embodiment, database 170 is a dedicated mass storage device implemented in software, hardware, or a combination of hardware and software. In one embodiment, database 170 is a web-based function. As discussed in more detail below, in one embodiment, a process for personalized healthcare related expense investment planning, and/or one or more computing system implemented processes, is/are stored in whole, or in part, in database 170.

In one embodiment, computing system 100 and database 170, are coupled to a server system 120 by network 130. Server system 120 typically includes a server system display device 125, a server system processor 121, a server system memory 123, and a server system network interface 122. As discussed in more detail below, in one embodiment, a process for personalized healthcare related expense investment planning, and/or one or more computing system implemented processes, is/are stored in whole, or in part, in server system 120.

Network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether known at the time of filing or as later developed. In various embodiments, server system network interface 122 and I/O interface 105 include analog modems, digital modems, a network interface card, a broadband connection, or any other means for communicably coupling computing system 100, database 170, and server system 120, via network 130, whether known at the time of filing or as later developed.

Those of skill in the art will readily recognize that the components shown in FIG. 1, such as computing system 100, database 170, server system 120, and their respective components, are shown for illustrative purposes only and that architectures with more or fewer components can implement, and benefit from, a process for personalized healthcare related expense investment planning, such as exemplary process for personalized healthcare related expense investment planning 200 discussed below. Moreover, one or more components of computing system 100, database 170, and server system 120 may be located remotely from their respective system and accessed via network, as discussed herein. In addition, the particular type of, and configuration of, computing systems 100, database 170, and server system 120 are not relevant.

As discussed in more detail below, in one embodiment, a process for personalized healthcare related expense investment planning, and/or one or more computing system implemented processes, is/are stored in whole, or in part, in memory system 103 and/or cache memory 103A, of computing system 100, and/or in server memory system 123 of server system 120 and/or in database 170, and executed on computing system 100. As used herein, a memory refers to a volatile memory, a non-volatile memory, or any combination of the two.

Although a process for personalized healthcare related expense investment planning, and/or one or more computing system implemented processes, can sometimes be referred to herein, alternatively, as a process, an application, a module, a program, a component of a software system, a component of a software package, a component of a parent system, or a feature of a parent system, this terminology is illustrative only. In some embodiments, a process for personalized healthcare related expense investment planning, and/or one or more computing system implemented processes, is/are capable of being called from an application or the operating system. In one embodiment, an application or program is generally defined to be any executable code. Moreover, those of skill in the art will understand that when it is said that an application or an operation takes some action, the action is the result of executing one or more instructions by a processor, such as processor 101 or server system processor 121. In one embodiment, execution of a process for personalized healthcare related expense investment planning, and/or one or more computing system implemented processes, by processor 101 or server system processor 121, results in the operations of an agent computer process (not shown) and/or a rule computer process (not shown).

In one embodiment, a process for personalized healthcare related expense investment planning, and/or one or more computing system implemented processes, is/are a computer application or process implemented and/or run and/or stored, in full, or in part, in, or on, a computer program product. Herein, a computer program product comprises a medium configured to store and/or transport computer readable code, whether known at the time of filing or as later developed. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or process capable of delivering computer readable data representing computer readable code, whether known at the time of filing or as later developed. This medium may belong to a computing system, such as computing system 100 of FIG. 1, described above. However, the medium also may be removed from the computing system.

For example, all, or part, of a process for personalized healthcare related expense investment planning, and/or one or more computing system implemented processes, may be stored in a memory that is physically located in a location, such as server system memory 123, or database 170, of FIG. 1, different from a computing system, such as computing system 100 of FIG. 1, utilizing a process for personalized healthcare related expense investment planning, and/or one or more computing system implemented processes. In one embodiment, all, or part, of a process for personalized healthcare related expense investment planning, and/or one or more computing system implemented processes, may be stored in a memory that is physically located, separate from the computing system's processor(s), such as processor 101 of FIG. 1, and the computing system processor(s) can be coupled to the memory in a client-server system, such as server system 120 of FIG. 1, or, alternatively, via connection to another computer, such as computing system 100 of FIG. 1, via modems and analog lines, digital interfaces and a digital carrier line, or wireless or cellular connections.

In one embodiment, the computing systems and/or server system, such as computing system 100 and/or server system 120 of FIG. 1, running and/or utilizing and/or storing all, or part, of a process for personalized healthcare related expense investment planning, and/or one or more computing system implemented processes, is a portable computer, a workstation, a two-way pager, a cellular telephone, a smart phone, a digital wireless telephone, a personal digital assistant, a server computer, an Internet appliance, or any other device that includes components that can execute all, or part, of a process for personalized healthcare related expense investment planning, and/or one or more computing system implemented processes, in accordance with at least one of the embodiments as described herein. Similarly, in another embodiment, a process for personalized healthcare related expense investment planning, and/or one or more computing system implemented processes, is/are implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

Herein, the terms "user", "investor", "investor/user" and "user/investor", are used interchangeably to denote: any person or persons, such as an individual or family representative, a healthcare plan administrator, a broker, an insurance agent, an investment professional, or an investment advisor; any institution, such as an investment agency, plan administrator service, insurance provider, brokerage; any agent of a person or persons; any agent of an institution; or any other individual or group participating in, and/or providing, and/or facilitating, and/or administering, an investment plan, program, scheme, account or mechanism and/or healthcare expense plan/program.

In accordance with one embodiment, a method and system for personalized healthcare related expense investment planning includes a process for personalized healthcare related expense investment planning whereby, in one embodiment, a timeframe of interest is defined during which the investor/user wishes to provide funds to cover healthcare expenses. In one embodiment, the user's healthcare service utilization for the defined timeframe is then projected/predicted using a personalized healthcare service utilization model. In one embodiment, the cost of the user's projected healthcare service utilization for the defined timeframe is then calculated/predicted based on the user taking part in one or more defined healthcare programs. In one embodiment, the calculated cost of the user's projected healthcare service utilization for the defined timeframe is then used to select an investment plan and/or strategy to provide healthcare expense funds for the defined timeframe.

Figure 2:
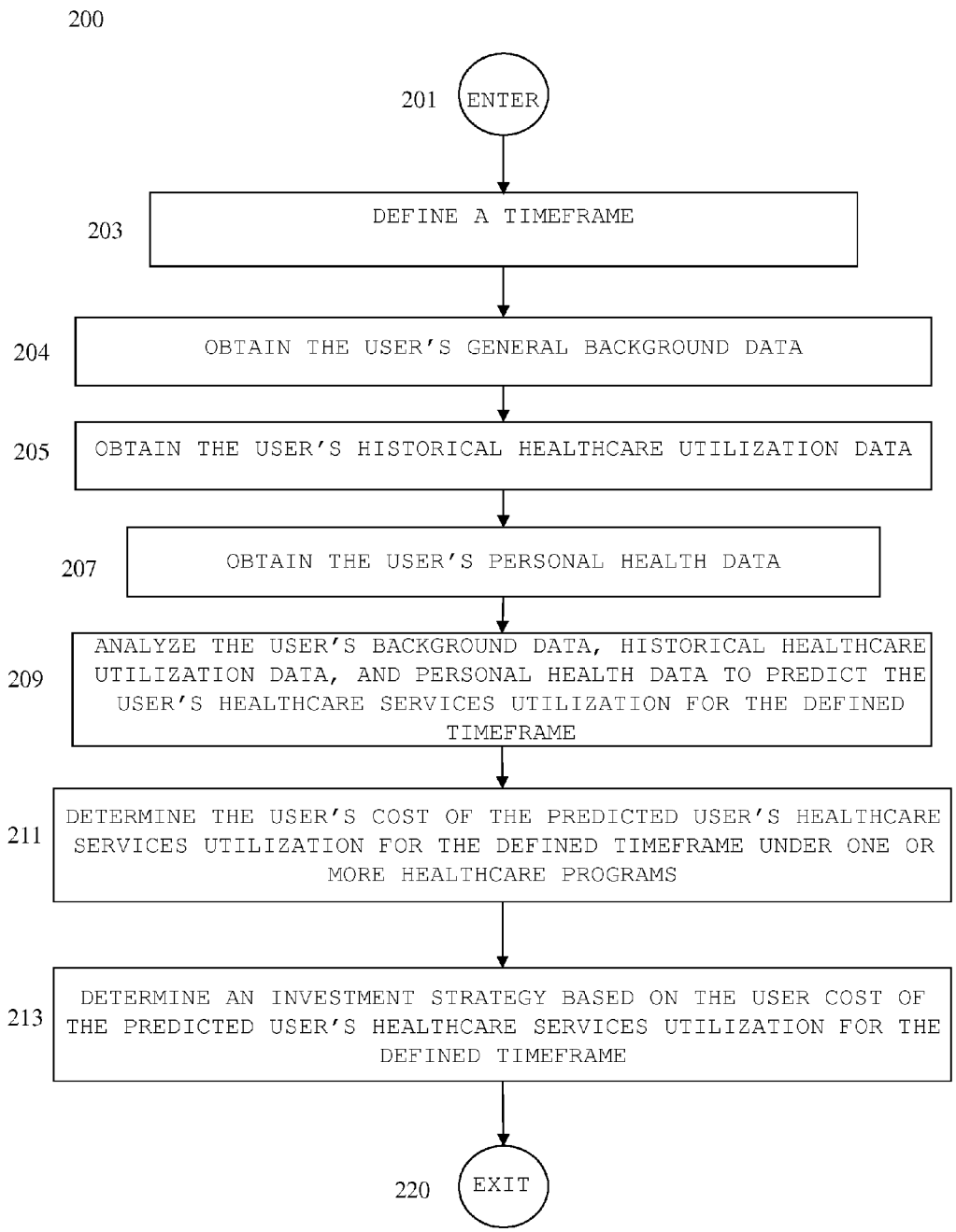
FIG. 2 is a flow chart depicting a process for personalized healthcare related expense investment planning in accordance with one embodiment.

FIG. 2 a flow chart depicting a process for personalized healthcare related expense investment planning 200 in accordance with one embodiment. Process for personalized healthcare related expense investment planning 200 begins at ENTER OPERATION 201 of FIG. 2 and process flow proceeds to DEFINE A TIMEFRAME OPERATION 203.

In one embodiment, at DEFINE A TIMEFRAME OPERATION 203 a user defines a timeframe of the healthcare expenses for which the user wishes ensure he or she has funds available to cover. That is to say, the user decides what timeframe the healthcare expenses are expected to be paid.

In one embodiment, the timeframe of DEFINE A TIMEFRAME OPERATION 203 is defined by the user of process for personalized healthcare related expense investment planning 200. In one embodiment, the timeframe is set as a default value by the provider of process for personalized healthcare related expense investment planning 200 with, in one embodiment, a user override feature.

In one embodiment, the timeframe of DEFINE A TIMEFRAME OPERATION 203 is set to coincide with a user's remaining life, including retirement. In one embodiment, the timeframe can be set to shorter periods such as, but not limited to: a month; a quarter; six months; a year; multiple years; a decade; multiple decades; a working lifetime; or any other timeframe desired by the user of process for personalized healthcare related expense investment planning 200 and/or the provider of process for personalized healthcare related expense investment planning 200.

In one embodiment, the timeframe of DEFINE A TIMEFRAME OPERATION 203 is set by the user using a user interface device, such as a keyboard, mouse, touch pad, voice recognition software, or any other means and/or mechanism for converting user actions into computing system processes.

As discussed in more detail below, the timeframe chosen at DEFINE A TIMEFRAME OPERATION 203 is important not only because it defines the amount of time of interest, but also because it defines a stage in life for the user and, as discussed below, the user's stage in life is often highly determinative of the user's expected healthcare service utilization. As an example, a male user of age 25 who defines a timeframe of five years at DEFINE A TIMEFRAME OPERATION 203 is statistically less likely to incur healthcare expenses associated with an enlarged prostrate than a male user of age 55 over the same five year period. In addition, some diseases/conditions are statically more likely to reveal themselves in certain stages of life such as young adult, middle age, old age etc. and, in some cases, once the critical stage of life/window has passed the likelihood of these conditions occurring drops off significantly. One very common example would be maternity expenses for a female user. Consequently, in one embodiment, the choice of timeframe at DEFINE A TIMEFRAME OPERATION 203 can be very significant and a controlling factor.

In one embodiment, once the timeframe is established at DEFINE A TIMEFRAME OPERATION 203, process flow proceeds to OBTAIN THE USER'S GENERAL BACKGROUND DATA OPERATION 204.

In one embodiment, at OBTAIN THE USER'S GENERAL BACKGROUND DATA OPERATION 204, data representing the user's general background is obtained. In one embodiment, the general background data includes general/demographic data about the user such as, but not limited to: the user's age; the user's sex; the user's occupation; the user's area of residence; the user's race and/or ethnic background; and/or any other general information about the user considered by the user, and/or any other party, to be significant and/or indicative of the user's future health. In addition, in one embodiment, at OBTAIN THE USER'S GENERAL BACKGROUND DATA OPERATION 204, data representing the recommended and/or average utilization of the average person of the user's background over the defined timeframe is obtained as well as any general health data/statistics associated with persons having backgrounds similar to the user.

As discussed in more detail below, the user's general background data obtained at OBTAIN THE USER'S GENERAL BACKGROUND DATA OPERATION 204 is combined with other data discussed below to create a personalized projected healthcare service utilization model for the user. To this end, the user's general background data is helpful to predict the healthcare service utilization for an average person like the user over the defined timeframe and provide a generalized base usage model. Currently, for the few investment plans that do take healthcare costs into account, this is typically the total extent of the projected healthcare expense analysis conducted.

In one embodiment, the data representing the user's general background data is obtained directly from the user. In one embodiment, the data is provided to process for personalized healthcare related expense investment planning 200 at OBTAIN THE USER'S GENERAL BACKGROUND DATA OPERATION 204 by entering the data into a user interface displayed on a computing system, such as computing system 100 described above. In other embodiments, the data representing the user's general background data is obtained at OBTAIN THE USER'S GENERAL BACKGROUND DATA OPERATION 204 by any means for obtaining, collecting, accessing, entering, transferring, relaying and/or providing data in any form, to a process, such as process for personalized healthcare related expense investment planning 200, whether known at the time of filing or as developed thereafter.

In one embodiment, process for personalized healthcare related expense investment planning 200 is part of a parent personal health expense management, personal financial, business financial, accounting, or tax preparation software system, program, package or application, such as computing system implemented process 180 of FIG. 1, that implements, includes, is accessed by, and/or is otherwise associated with process for personalized healthcare related expense investment planning 200, as one of multiple features. In these embodiments, the data representing the user's general background data may be obtained directly from, or through, the parent process.

In one embodiment, the user's general background data is electronic data and the data is stored, in whole, or in part, in a database maintained by, accessible by, owned by, or otherwise related to, a provider of process for personalized healthcare related expense investment planning 200 by any one of the numerous mechanisms known to those of skill in the art. For instance, in one embodiment, the data, in whole, or in part, is stored in a memory system, such as memory system 103 or server memory system 123, or database 170, of FIG. 1, or in a cache memory, such as cache memory 103A of FIG. 1, or in any main memory or mass memory, associated with a computing device, such as computing system 100 described above. In one embodiment, the data, in whole, or in part, is stored in any computing device and/or server system, such as computing system 100 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the data stored as described above is maintained, in whole, or in part, by: the provider of process for personalized healthcare related expense investment planning 200; an investment service; a health insurance provider; a healthcare service provider; a third party data storage institution; any third party service or institution; or any other parties. In these embodiments, access to the user's general background data is then granted to process for personalized healthcare related expense investment planning 200 at OBTAIN THE USER'S GENERAL BACKGROUND DATA OPERATION 204 by providing access to the data and/or providing the data on a computer program product.

In other embodiments, the user's general background data is provided through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

In other embodiments, the user's general background data is obtained/accessed/collected through e-mail or through text messaging. In other embodiments, the user's general background data is provided to process for personalized healthcare related expense investment planning 200 through any method, apparatus, process or mechanism for transferring data and/or text from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, in addition to the user's general background data being obtained at OBTAIN THE USER'S GENERAL BACKGROUND DATA OPERATION 204, the user's historical healthcare utilization data is obtained at OBTAIN THE USER'S HISTORICAL HEALTHCARE UTILIZATION DATA OPERATION 205.

In one embodiment, the user's historical healthcare utilization data includes, but is not limited to: data representing the user's actual historical utilization of his or her healthcare program; whether or not the user actually takes advantage of regularly scheduled check ups and/or other preventative measures as would expected based on the user's general background data obtained at OBTAIN THE USER'S GENERAL BACKGROUND DATA OPERATION 204; whether the user follows and/or stays on any recommended routines, programs and medications; the user's family medical history; and/or the user's overall usage and historical attitude towards healthcare in general.

In one embodiment, at OBTAIN THE USER'S HISTORICAL HEALTHCARE UTILIZATION DATA OPERATION 205, data representing the user's actual historical utilization of his or her healthcare program is obtained to analyze the user's specific healthcare utilization habits such as whether or not the user actually takes advantage of regularly scheduled check ups and/or other preventative measures and/or whether the user follows and/or stays on any recommended routines, programs and medications. This data is not only valuable as used to estimate costs for preventative healthcare services, but it can also be indicative of the user's healthcare "personality", that is to say, does the user take healthcare and/or his or her health seriously. A user's healthcare personality, in-and-of itself, can be highly determinative of future health related events. For instance, is the user likely to discover, and head off, the onset of potential health issues or is the user likely to discover the issues only after they have fully manifested themselves, and perhaps only after a trip to the ER.

In one embodiment, at OBTAIN THE USER'S HISTORICAL HEALTHCARE UTILIZATION DATA OPERATION 205, data representing the user's family medical history is obtained. It has long been recognized that family history and genetics play a very significant role in an individual's health and pre-disposition to numerous diseases. Diabetes, heart disease, cancer, high blood pressure, and cholesterol are but a few of the numerous diseases that are known to have a significant genetic factor.

In one embodiment, at OBTAIN THE USER'S HISTORICAL HEALTHCARE UTILIZATION DATA OPERATION 205 any other data representing the user's historical healthcare utilization deemed significant and/or necessary and/or indicative of future health is obtained.

Returning to FIG. 2, in one embodiment the user's historical healthcare utilization data is obtained at OBTAIN THE USER'S HISTORICAL HEALTHCARE UTILIZATION DATA OPERATION 205 directly from the user. In one embodiment, the data is provided to process for personalized healthcare related expense investment planning 200 at OBTAIN THE USER'S HISTORICAL HEALTHCARE UTILIZATION DATA OPERATION 205 by entering the data into a user interface displayed on a computing system, such as computing system 100 described above. In other embodiments, the data is obtained at OBTAIN THE USER'S HISTORICAL HEALTHCARE UTILIZATION DATA OPERATION 205 by any means for obtaining, collecting, accessing, entering, transferring, relaying and/or providing data in any form, to a process, such as process for personalized healthcare related expense investment planning 200, whether known at the time of filing or as developed thereafter.

For instance, in one embodiment, process for personalized healthcare related expense investment planning 200 is part of a parent personal health expense management, personal financial, business financial, accounting, or tax preparation software system, program, package or application, such as computing system implemented process 180 of FIG. 1, that implements, includes, is accessed by, and/or is otherwise associated with process for personalized healthcare related expense investment planning 200, as one of multiple features. In these embodiments, the data representing the user's historical healthcare utilization may be obtained directly from, or through, the parent process.

In one embodiment, the user's historical healthcare utilization data is obtained at OBTAIN THE USER'S HISTORICAL HEALTHCARE UTILIZATION DATA OPERATION 205 from invoices/patient bills and/or claim data provided to process for personalized healthcare related expense investment planning 200 by health care providers such as hospitals and/or doctors and/or other medical service personnel.

In one embodiment, process for personalized healthcare related expense investment planning 200 is part of a parent personal health expense management, personal financial, business financial, accounting, or tax preparation software system, program, package or application, such as computing system implemented process 180 of FIG. 1, that implements, includes, is accessed by, and/or is otherwise associated with process for personalized healthcare related expense investment planning 200, as one of multiple features. Some of these parent systems provide the capability to obtain, receive, and/or process electronic copies of the invoices/claims, often in their specific formats, and then store the data for use by process for personalized healthcare related expense investment planning 200 in one of numerous locations by one of numerous methods known to those of skill in the art.

In one embodiment, the user's historical healthcare utilization data is obtained at OBTAIN THE USER'S HISTORICAL HEALTHCARE UTILIZATION DATA OPERATION 205 from Explanation of Benefits (EOB) data provided to process for personalized healthcare related expense investment planning 200 by a health insurance provider and/or the user of process for personalized healthcare related expense investment planning 200.

According to one embodiment, the health insurance providers transfer electronic copies of the EOBs, often in specific formats, to the provider of process for personalized healthcare related expense investment planning 200. As noted above, in one embodiment, process for personalized healthcare related expense investment planning 200 is part of a parent personal health expense management, personal financial, business financial, accounting, or tax preparation software system, program, package or application, such as computing system implemented process 180 of FIG. 1, that implements, includes, is accessed by, and/or is otherwise associated with process for personalized healthcare related expense investment planning 200, as one of multiple features. Some of these parent systems provide the capability to obtain, receive, and/or process electronic copies of the EOBs and then store the data for use by process for personalized healthcare related expense investment planning 200 in one of numerous locations by one of numerous methods known to those of skill in the art.

In some embodiments, the user's historical healthcare utilization data is obtained at OBTAIN THE USER'S HISTORICAL HEALTHCARE UTILIZATION DATA OPERATION 205 from any combination of the above sources and/or from any other source of data, whether known at the time of filing or as developed thereafter.

In one embodiment, the data representing the user's historical healthcare utilization is stored, in whole, or in part, in a database maintained by, accessible by, owned by, or otherwise related to, a provider of process for personalized healthcare related expense investment planning 200 by any one of the numerous mechanisms known to those of skill in the art. For instance, in one embodiment, the data, in whole, or in part, is stored in a memory system, such as memory system 103 or server memory system 123, or database 170, of FIG. 1, or in a cache memory, such as cache memory 103A of FIG. 1, or in any main memory or mass memory, associated with a computing device, such as computing system 100 described above. In one embodiment, the data, in whole, or in part, is stored in any computing device and/or server system, such as computing system 100 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the data stored as described above is maintained, in whole, or in part, by: the provider of process for personalized healthcare related expense investment planning 200; an investment service; a health insurance provider; a healthcare service provider; a third party data storage institution; any third party service or institution; or any other parties. In these embodiments, access to the user's general background data is then granted to process for personalized healthcare related expense investment planning 200 at OBTAIN THE USER'S HISTORICAL HEALTHCARE UTILIZATION DATA OPERATION 205 by providing access to the data and/or providing the data on a computer program product.

In other embodiments, the data representing the user's historical healthcare utilization is provided through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

In other embodiments, the data representing the user's historical healthcare utilization is obtained/accessed/collected through e-mail or through text messaging. In other embodiments, the data representing the user's historical healthcare utilization is provided to process for personalized healthcare related expense investment planning 200 through any method, apparatus, process or mechanism for transferring data and/or text from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, in addition to the user's general background data being obtained at OBTAIN THE USER'S GENERAL BACKGROUND DATA OPERATION 204 and the user's historical healthcare utilization data being obtained at OBTAIN THE USER'S HISTORICAL HEALTHCARE UTILIZATION DATA OPERATION 205, health profile data that is highly personalized and specific to the user is obtained at OBTAIN THE USER'S PERSONAL HEALTH PROFILE DATA OPERATION 207.

In one embodiment, the user's personal health profile data includes, but is not limited to, personal health profile data such as: existing disease, diagnoses, treatment programs; the likely result of a diagnosed user condition based on the general disposition of the user to making use of available healthcare and/or following medical advice; trends/patterns in the user's specific medical history and/or lab and/or other clinical results; specific activities the user takes part in; the user's general activity level; and/or any other data that is indicative of health risks, health attitudes, and/or pre-dispositions to disease and/or injury specific to the user.

In one embodiment, at OBTAIN THE USER'S PERSONAL HEALTH PROFILE DATA OPERATION 207, data representing existing disease, diagnoses, treatment programs and the specific health of the user is obtained from clinical results and/or medical records. As discussed below, this data is used to predict future healthcare service utilization based on typical services needed to treat any of these conditions. In addition, in one embodiment, some of the data obtained at OBTAIN THE USER'S HISTORICAL HEALTHCARE UTILIZATION DATA OPERATION 205 regarding the user's actual historical utilization of healthcare services is used to predict how the user will respond/behave in light of these known conditions. As an example, a user diagnosed with high cholesterol who has shown a willingness to take prescribed medications and seek regular checkups will be likely to incur only the healthcare expenses associated with the medications and checkups. In contrast, a user with the same diagnosis who is not likely to take the prescribed medication and see the doctor regularly is more likely to suffer a heat attack and/or need by-pass surgery. In one embodiment, at OBTAIN THE USER'S PERSONAL HEALTH PROFILE DATA OPERATION 207, other data representing trends/patterns in the user's specific medical history and/or lab results are obtained and this data is used to predict future illness.

In one embodiment, at OBTAIN THE USER'S PERSONAL HEALTH PROFILE DATA OPERATION 207, data representing activities the user takes part in and the user's general activity level is obtained and used to predict future illness and/or injury. For instance, a user who takes part in strenuous activities like mountain biking is more likely to suffer broken limbs while a user who likes to watch TV is more likely to suffer from cardio-vascular problems. In one embodiment, at OBTAIN THE USER'S PERSONAL HEALTH PROFILE DATA OPERATION 207, any other data that is indicative of health risks and/or pre-dispositions to disease and/or injury specific to the user is obtained.

As with the other data obtained by process for personalized healthcare related expense investment planning 200 discussed above, the data obtained at OBTAIN THE USER'S PERSONAL HEALTH PROFILE DATA OPERATION 207 might be, under other circumstances, considered highly personal. However, it must be borne in mind that, in one embodiment, the data is not meant to be shared beyond those persons designated by the user and that the accuracy of the analysis using the data is highly beneficial to the goals of process for personalized healthcare related expense investment planning 200 and the user.

Returning to FIG. 2, in one embodiment the user's personal health profile data is obtained at OBTAIN THE USER'S PERSONAL HEALTH PROFILE DATA OPERATION 207 directly from the user and/or the user's medical records/files. In one embodiment, the data is provided to process for personalized healthcare related expense investment planning 200 at OBTAIN THE USER'S PERSONAL HEALTH PROFILE DATA OPERATION 207 by entering the data into a user interface displayed on a computing system, such as computing system 100 described above. In other embodiments, the data is obtained at OBTAIN THE USER'S PERSONAL HEALTH PROFILE DATA OPERATION 207 by any means for obtaining, collecting, accessing, entering, transferring, relaying and/or providing data in any form, to a process, such as process for personalized healthcare related expense investment planning 200, whether known at the time of filing or as developed thereafter.

For instance, in one embodiment, process for personalized healthcare related expense investment planning 200 is part of a parent personal health expense management, personal financial, business financial, accounting, or tax preparation software system, program, package or application, such as computing system implemented process 180 of FIG. 1, that implements, includes, is accessed by, and/or is otherwise associated with process for personalized healthcare related expense investment planning 200, as one of multiple features. In these embodiments, the data representing the user's personal health profile data may be obtained directly from, or through, the parent process.

Returning to FIG. 2, in one embodiment, the user's personal health profile data is obtained at OBTAIN THE USER'S PERSONAL HEALTH PROFILE DATA OPERATION 207 from invoices/patient bills and/or claim data provided to process for personalized healthcare related expense investment planning 200 by health care providers such as hospitals and/or doctors and/or other medical service personnel.

As discussed above, in one embodiment, process for personalized healthcare related expense investment planning 200 is part of a parent personal health expense management, personal financial, business financial, accounting, or tax preparation software system, program, package or application, such as computing system implemented process 180 of FIG. 1, that implements, includes, is accessed by, and/or is otherwise associated with process for personalized healthcare related expense investment planning 200, as one of multiple features. Some of these parent systems provide the capability to obtain, receive, and/or process electronic copies of the invoices/claims, often in their specific formats, and then store the data for use by process for personalized healthcare related expense investment planning 200 in one of numerous locations by one of numerous methods known to those of skill in the art.

In one embodiment, the user's personal health profile data is obtained at OBTAIN THE USER'S PERSONAL HEALTH PROFILE DATA OPERATION 207 from Explanation of Benefits (EOB) data provided to process for personalized healthcare related expense investment planning 200 by a health insurance provider and/or the user of process for personalized healthcare related expense investment planning 200.

According to one embodiment, the health insurance providers transfer electronic copies of the EOBs, often in specific formats, to the provider of process for personalized healthcare related expense investment planning 200. As noted above, in one embodiment, process for personalized healthcare related expense investment planning 200 is part of a parent personal health expense management, personal financial, business financial, accounting, or tax preparation software system, program, package or application, such as computing system implemented process 180 of FIG. 1, that implements, includes, is accessed by, and/or is otherwise associated with process for personalized healthcare related expense investment planning 200, as one of multiple features. Some of these parent systems provide the capability to obtain, receive, and/or process electronic copies of the EOBs and then store the data for use by process for personalized healthcare related expense investment planning 200 in one of numerous locations by one of numerous methods known to those of skill in the art.

In some embodiments, the user's personal health profile data is obtained at OBTAIN THE USER'S PERSONAL HEALTH PROFILE DATA OPERATION 207 from any combination of the above sources and/or from any other source of data, whether known at the time of filing or as developed thereafter.

In one embodiment, the user's personal health profile data is stored, in whole, or in part, in a database maintained by, accessible by, owned by, or otherwise related to, a provider of process for personalized healthcare related expense investment planning 200 by any one of the numerous mechanisms known to those of skill in the art. For instance, in one embodiment, the data, in whole, or in part, is stored in a memory system, such as memory system 103 or server memory system 123, or database 170, of FIG. 1, or in a cache memory, such as cache memory 103A of FIG. 1, or in any main memory or mass memory, associated with a computing device, such as computing system 100 described above. In one embodiment, the data, in whole, or in part, is stored in any computing device and/or server system, such as computing system 100 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the data stored as described above is maintained, in whole, or in part, by: the provider of process for personalized healthcare related expense investment planning 200; an investment service; a health insurance provider; a healthcare service provider; a third party data storage institution; any third party service or institution; or any other parties. In these embodiments, access to the user's personal health profile data is then granted to process for personalized healthcare related expense investment planning 200 at OBTAIN THE USER'S PERSONAL HEALTH PROFILE DATA OPERATION 207 by providing access to the data and/or providing the data on a computer program product.

In other embodiments, the user's personal health profile data is provided through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

In other embodiments, the user's personal health profile data is obtained/accessed/collected through e-mail or through text messaging. In other embodiments, the user's personal health profile data is provided to process for personalized healthcare related expense investment planning 200 through any method, apparatus, process or mechanism for transferring data and/or text from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, once the user's general background data is obtained at OBTAIN THE USER'S GENERAL BACKGROUND DATA OPERATION 204 and the user's historical healthcare utilization data is obtained at OBTAIN THE USER'S HISTORICAL HEALTHCARE UTILIZATION DATA OPERATION 205 and the user's personal health profile data is obtained at OBTAIN THE USER'S PERSONAL HEALTH PROFILE DATA OPERATION 207, process flow proceeds to ANALYZE THE USER'S BACKGROUND DATA, HISTORICAL HEALTHCARE UTILIZATION DATA, AND PERSONAL HEALTH DATA TO PREDICT THE USER'S HEALTHCARE SERVICES UTILIZATION FOR THE DEFINED TIMEFRAME OPERATION 209.

In one embodiment at ANALYZE THE USER'S BACKGROUND DATA, HISTORICAL HEALTHCARE UTILIZATION DATA, AND PERSONAL HEALTH DATA TO PREDICT THE USER'S HEALTHCARE SERVICES UTILIZATION FOR THE DEFINED TIMEFRAME OPERATION 209, the user's general background data obtained at OBTAIN THE USER'S GENERAL BACKGROUND DATA OPERATION 204, the user's historical healthcare utilization data obtained at OBTAIN THE USER'S HISTORICAL HEALTHCARE UTILIZATION DATA OPERATION 205, and the user's personal health profile data obtained at OBTAIN THE USER'S PERSONAL HEALTH PROFILE DATA OPERATION 207 is analyzed to create a personalized projected healthcare service utilization model for the user.

In one embodiment, the personalized projected healthcare service utilization model is created by using all, or part, of the data obtained at: OBTAIN THE USER'S GENERAL BACKGROUND DATA OPERATION 204; OBTAIN THE USER'S HISTORICAL HEALTHCARE UTILIZATION DATA OPERATION 205; and OBTAIN THE USER'S PERSONAL HEALTH PROFILE DATA OPERATION 207.

In one embodiment, any and/or all of the obtained at: OBTAIN THE USER'S GENERAL BACKGROUND DATA OPERATION 204; OBTAIN THE USER'S HISTORICAL HEALTHCARE UTILIZATION DATA OPERATION 205; and OBTAIN THE USER'S PERSONAL HEALTH PROFILE DATA OPERATION 207 is combined with, processed by, analyzed by, and/or supplemented with/by, input from experts in the medical field, healthcare professionals, insurance experts, actuaries, and any other persons, groups, programs, applications, processes, means mechanisms and/or institutions capable of analyzing health data and making predictions of future health events based on the data.

In one embodiment, the personalized projected healthcare service utilization model created at ANALYZE THE USER'S BACKGROUND DATA, HISTORICAL HEALTHCARE UTILIZATION DATA, AND PERSONAL HEALTH DATA TO PREDICT THE USER'S HEALTHCARE SERVICES UTILIZATION FOR THE DEFINED TIMEFRAME OPERATION 209 is used to create user's healthcare service utilization data indicating the user's likely healthcare service utilization for the timeframe defined at DEFINE A TIMEFRAME OPERATION 203.

In one embodiment, the user's healthcare service utilization data is presented as a listing of services likely to be used over the defined timeframe based on the data provided. In one embodiment, this listing includes all regularly scheduled services the user is likely to use along with services the user is likely to use based on his or her more specific and personal data as obtained by process for personalized healthcare related expense investment planning 200.

Methods, means, mechanisms and processes for developing a utilization model based on input data, such as a personalized projected healthcare service utilization model based on the data obtained by process for personalized healthcare related expense investment planning 200, are well known to those of skill in the art. In addition, the specific use of the data and the operation of a given personalized projected healthcare service utilization model, will vary from user-to-user, application-to-application, embodiment-to-embodiment, and model developer-to-model developer. Consequently, a more detailed description of specific methods, means, mechanisms and processes for developing a utilization model based on input data, such as a personalized projected healthcare service utilization model based on data obtained by process for personalized healthcare related expense investment planning 200, is omitted here to avoid detracting from the invention.

In one embodiment, once the personalized projected healthcare service utilization model for the user is used to create the user's healthcare service utilization data for the defined timeframe, the user's healthcare service utilization data for the defined timeframe is stored, in whole, or in part, in a database maintained by, accessible by, owned by, or otherwise related to, a provider of process for personalized healthcare related expense investment planning 200 by any one of the numerous mechanisms known to those of skill in the art. For instance, in one embodiment, the data, in whole, or in part, is stored in a memory system, such as memory system 103 or server memory system 123, or database 170, of FIG. 1, or in a cache memory, such as cache memory 103A of FIG. 1, or in any main memory or mass memory, associated with a computing device, such as computing system 100 described above. In one embodiment, the data, in whole, or in part, is stored in any computing device and/or server system, such as computing system 100 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the data stored as described above is maintained, in whole, or in part, by: the provider of process for personalized healthcare related expense investment planning 200; an investment service; a health insurance provider; a healthcare service provider; a third party data storage institution; any third party service or institution; or any other parties. In these embodiments, access to the data representing the user's predicted healthcare service utilization for the defined timeframe is then granted to process for personalized healthcare related expense investment planning 200 at OBTAIN THE USER'S PERSONAL HEALTH PROFILE DATA OPERATION 207 by providing access to the data and/or providing the data on a computer program product.

In other embodiments, data representing the user's predicted healthcare service utilization for the defined timeframe is provided through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

In other embodiments, the user's healthcare service utilization data for the defined timeframe is obtained/accessed/collected through e-mail or through text messaging. In other embodiments, the user's healthcare service utilization data for the defined timeframe is provided to process for personalized healthcare related expense investment planning 200 through any method, apparatus, process or mechanism for transferring data and/or text from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, once the personalized projected healthcare service utilization model for the user is used to predict the user's healthcare service utilization for the defined timeframe at ANALYZE THE USER'S BACKGROUND DATA, HISTORICAL HEALTHCARE UTILIZATION DATA, AND PERSONAL HEALTH DATA TO PREDICT THE USER'S HEALTHCARE SERVICES UTILIZATION FOR THE DEFINED TIMEFRAME OPERATION 209, process flow proceeds to DETERMINE THE USER'S COST OF THE PREDICTED USER'S HEALTHCARE SERVICES UTILIZATION FOR THE DEFINED TIMEFRAME UNDER ONE OR MORE HEALTHCARE PROGRAMS OPERATION 211.

In one embodiment, at DETERMINE THE USER'S COST OF THE PREDICTED USER'S HEALTHCARE SERVICES UTILIZATION FOR THE DEFINED TIMEFRAME UNDER ONE OR MORE HEALTHCARE PROGRAMS OPERATION 211, the user's healthcare service utilization data for the defined timeframe is used to determine/predict the user's out-of pocket costs for the predicted healthcare service utilization, as predicted.

As noted above, in one embodiment, the user's healthcare service utilization data is presented at ANALYZE THE USER'S BACKGROUND DATA, HISTORICAL HEALTHCARE UTILIZATION DATA, AND PERSONAL HEALTH DATA TO PREDICT THE USER'S HEALTHCARE SERVICES UTILIZATION FOR THE DEFINED TIMEFRAME OPERATION 209 as a listing of services likely to be used over the defined timeframe based on the data provided through process for personalized healthcare related expense investment planning 200. In this embodiment, at DETERMINE THE USER'S COST OF THE PREDICTED USER'S HEALTHCARE SERVICES UTILIZATION FOR THE DEFINED TIMEFRAME UNDER ONE OR MORE HEALTHCARE PROGRAMS OPERATION 211 the cumulative user's out-of-pocket cost for these services is calculated by summing the individual service costs that would be incurred when the services are rendered under a given healthcare program.

In one embodiment, the analysis of DETERMINE THE USER'S COST OF THE PREDICTED USER'S HEALTHCARE SERVICES UTILIZATION FOR THE DEFINED TIMEFRAME UNDER ONE OR MORE HEALTHCARE PROGRAMS OPERATION 211 can be repeated for various specific healthcare programs such as a PPO program, an HMO program, a user-sponsored program, an employer-sponsored program, Federal, State or Local Healthcare programs, etc. This feature allows the user to obtain predicted cost data for various programs in order to make a best fit choice. This feature can also provide the user with a more realistic analysis over time. For instance, an employer sponsored healthcare plan may only be available while the user is employed, then the user must depend on personal and/or government plans. Consequently, if the timeframe defined at DEFINE A TIMEFRAME OPERATION 203 includes this change of healthcare program event, an accurate analysis must include the change in user costs for healthcare services under the new plan and/or any change in cost of the plan itself.

In one embodiment, the data regarding the individual healthcare programs, and the costs associated with the one or more healthcare programs, is obtained by process for personalized healthcare related expense investment planning 200 at DETERMINE THE USER'S COST OF THE PREDICTED USER'S HEALTHCARE SERVICES UTILIZATION FOR THE DEFINED TIMEFRAME UNDER ONE OR MORE HEALTHCARE PROGRAMS OPERATION 211 by any of the means, mechanisms, methods and/or processes known in the art and/or as discussed herein, whether known at the time of filing, or as developed thereafter, either through public data or from the healthcare program providers.

In one embodiment, once the user's healthcare service utilization data for the defined timeframe is used to predict the user's out-of pocket costs at DETERMINE THE USER'S COST OF THE PREDICTED USER'S HEALTHCARE SERVICES UTILIZATION FOR THE DEFINED TIMEFRAME UNDER ONE OR MORE HEALTHCARE PROGRAMS OPERATION 211, data representing the user's predicted out-of pocket costs is stored and/or accessed by process for personalized healthcare related expense investment planning 200 using any of the any of the means, mechanisms, methods and/or processes known in the art and/or as discussed herein, whether known at the time of filing, or as developed thereafter.

In one embodiment, once the user's healthcare service utilization data for the defined timeframe is used to determine the user's predicted out-of pocket costs at DETERMINE THE USER'S COST OF THE PREDICTED USER'S HEALTHCARE SERVICES UTILIZATION FOR THE DEFINED TIMEFRAME UNDER ONE OR MORE HEALTHCARE PROGRAMS OPERATION 211, process flow proceeds to DETERMINE AN INVESTMENT STRATEGY BASED ON THE USER COST OF THE PREDICTED USER'S HEALTHCARE SERVICES UTILIZATION FOR THE DEFINED TIMEFRAME OPERATION 213.

In one embodiment, at DETERMINE AN INVESTMENT STRATEGY BASED ON THE USER COST OF THE PREDICTED USER'S HEALTHCARE SERVICES UTILIZATION FOR THE DEFINED TIMEFRAME OPERATION 213, the user's predicted out-of pocket costs over the defined timeframe is used to find one or more investment plans and/or strategies that are likely yield a return that best matches, is equal to, or greater than, the user's predicted out-of pocket costs over the defined timeframe and/or yield the best results in light of the user's specific resources and needs. In one embodiment, the particular investment plans and/or programs are determined using well known investment formulas and mechanisms substantially identical to those used for any other investment scheme including traditional retirement plans.

Methods, means, mechanisms and processes for developing an investment strategy and/or plan to yield a specific return and/or annuity are well known to those of skill in the art. In addition, the specific use of the data, the specific development of an investment strategy and/or plan, and the operation of a given investment strategy and/or plan will vary from user-to-user, investment advisor/model-to-investment advisor/model, application-to-application, and embodiment-to-embodiment. Consequently, a more detailed description of specific methods, means, mechanisms and processes for developing an investment strategy and/or plan to yield a specific return based on the user's predicted out-of pocket costs over the defined timeframe is omitted here to avoid detracting from the invention.

In one embodiment, once the user's predicted out-of pocket costs over the defined timeframe is used to find one or more investment plans and/or strategies that are likely yield a return that best matches the user's specific resources and needs at DETERMINE AN INVESTMENT STRATEGY BASED ON THE USER COST OF THE PREDICTED USER'S HEALTHCARE SERVICES UTILIZATION FOR THE DEFINED TIMEFRAME OPERATION 213, process flow proceeds to EXIT OPERATION 220 and process for personalized healthcare related expense investment planning 200 is exited and/or returns to ANALYZE THE USER'S BACKGROUND DATA, HISTORICAL HEALTHCARE UTILIZATION DATA, AND PERSONAL HEALTH DATA TO PREDICT THE USER'S HEALTHCARE SERVICES UTILIZATION FOR THE DEFINED TIMEFRAME OPERATION 209 or DETERMINE THE USER'S COST OF THE PREDICTED USER'S HEALTHCARE SERVICES UTILIZATION FOR THE DEFINED TIMEFRAME UNDER ONE OR MORE HEALTHCARE PROGRAMS OPERATION 211 to await new data.

Using process for personalized healthcare related expense investment planning 200, a user can more accurately plan and execute an investment strategy that includes more realistically projected healthcare expenses. Consequently, using process for personalized healthcare related expense investment planning 200, the user is more likely to realize the intended benefits of his or her planning and financial discipline.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "defining", "accessing", "analyzing", "obtaining", "determining", "collecting", "identifying", "transferring", "storing", "notifying", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for personalized healthcare related expense investment planning comprising:
   one or more computing processors;
   one or more memories coupled to the more or more computing processors, the one or more memories having stored therein instructions which when executed by the computing processor perform a process for personalized healthcare related expense investment planning comprising:
   defining a timeframe during which healthcare services will be paid;
   obtaining personalized health and healthcare related data for a user including historical healthcare utilization data indicating actual historical utilization of at least one healthcare program associated with the user, at least a portion of which is obtained electronically directly from a database coupled to either of a healthcare service provider or healthcare insurance provider computing system, the personalized health and healthcare related data for the user including specific data regarding specific high-risk sports activities in which the user engages;
   analyzing the personalized health and healthcare related data for the user to determine predicted healthcare services that the user is likely to utilize during the defined timeframe, the analysis including consideration of one or more potential injuries predicted to occur based on the specific data regarding specific high-risk sports activities in which the user engages;
   choosing one or more healthcare programs to be utilized by the user during the defined timeframe;
   determining the user's cost of the predicted healthcare services under the chosen one or more healthcare programs; and
   developing an investment plan for the user, the investment plan for the user being based, at least in part, on the user's cost of the predicted healthcare services.

2. The computing system implemented process for personalized healthcare related expense investment planning of claim 1, wherein;
   the timeframe defined at defining a timeframe during which healthcare services will be paid is the remainder of the user's working years.

3. The computing system implemented process for personalized healthcare related expense investment planning of claim 1, wherein;
   the timeframe defined at defining a timeframe during which healthcare services will be paid is the remainder of the user's life.

4. The computing system implemented process for personalized healthcare related expense investment planning of claim 3, wherein;
   the chosen one or more healthcare programs includes both an employer sponsored healthcare program and a government sponsored healthcare program.

5. The computing system implemented process for personalized healthcare related expense investment planning of claim 1, wherein;
   the user's historical healthcare utilization data includes data indicating the user's inclination to utilize preventative/maintenance healthcare services.

6. The computing system implemented process for personalized healthcare related expense investment planning of claim 1, wherein;
   obtaining personalized health and healthcare related data for a user comprises obtaining data representing the user's personal health profile.

7. The computing system implemented process for personalized healthcare related expense investment planning of claim 6, wherein;
   the data representing the user's personal health profile includes data indicating the user's pre-disposition to injury and/or disease based on the user's activities.

8. The computing system implemented process for personalized healthcare related expense investment planning of claim 6, wherein;
   the data representing the user's personal health profile includes data indicating the user's pre-disposition to injury and/or disease based on the user's attitude toward healthcare services utilization.

9. A system for personalized healthcare related expense investment planning comprising:
   one or more computing processors;
   one or more memories coupled to the more or more computing processors, the one or more memories having stored therein instructions which when executed by the computing processor perform a process for personalized healthcare related expense investment planning comprising:

defining a timeframe during which healthcare services will be paid;

obtaining personalized health and healthcare related data for a user including historical healthcare utilization data indicating actual historical utilization of at least one healthcare program associated with the user, at least a portion of which is obtained electronically directly from a database coupled to either of a healthcare service provider or healthcare insurance provider computing system, the personalized health and healthcare related data for a user comprising:

data representing the user's general background and demographics;

data representing the user's historical healthcare utilization; and data representing the user's personal health profile, including specific data regarding specific high-risk sports activities in which the user engages;

analyzing the personalized health and healthcare related data for the user to determine predicted healthcare services that the user is likely to utilize during the defined timeframe, the analysis including consideration of one or more potential injuries predicted to occur based on the specific data regarding specific high-risk sports activities in which the user engages;

choosing one or more healthcare programs to be utilized by the user during the defined timeframe;

determining the user's cost of the predicted healthcare services under the chosen one or more healthcare programs; and developing an investment plan for the user, the investment plan for the user being based, at least in part, on the user's cost of the predicted healthcare services.

10. A computer program product for providing a process for personalized healthcare related expense investment planning comprising:

a nontransitory computer readable medium;

and computer program code, encoded on the nontransitory computer readable medium, comprising computer readable instructions which when executed by a computing processor perform a process comprising:

obtaining personalized health and healthcare related data for a user including historical healthcare utilization data indicating actual historical utilization of at least one healthcare program associated with the user, at least a portion of which is obtained electronically directly from a database coupled to either of a healthcare service provider or healthcare insurance provider computing system, the personalized health and healthcare related data for the user including specific data regarding specific high-risk sports activities in which the user engages;

analyzing the personalized health and healthcare related data for the user to determine predicted healthcare services that the user is likely to utilize during a defined timeframe, the analysis including consideration of one or more potential injuries predicted to occur based on the specific data regarding specific high-risk sports activities in which the user engages;

defining one or more healthcare programs to be utilized by the user during the defined timeframe;

calculating the user's cost of the predicted healthcare services under the chosen one or more healthcare programs; and choosing an investment plan for the user, the investment plan for the user being based, at least in part, on the user's cost of the predicted healthcare services.

11. The computer program product for providing a process for personalized healthcare related expense investment planning of claim 10, wherein;

the defined timeframe is the remainder of the user's working years.

12. The computer program product for providing a process for personalized healthcare related expense investment planning of claim 10, wherein;

the defined timeframe is the remainder of the user's life.

13. The computer program product for providing a process for personalized healthcare related expense investment planning of claim 12, wherein;

the defined one or more healthcare programs includes both an employer sponsored healthcare program and a government sponsored healthcare program.

14. The computer program product for providing a process for personalized healthcare related expense investment planning of claim 10, wherein;

the user's historical healthcare utilization data includes data indicating the user's inclination to utilize preventative/maintenance healthcare services.

15. The computer program product for providing a process for personalized healthcare related expense investment planning of claim 10, wherein;

obtaining personalized health and healthcare related data for a user comprises obtaining data representing the user's personal health profile.

16. The computer program product for providing a process for personalized healthcare related expense investment planning of claim 15, wherein;

the data representing the user's personal health profile includes data indicating the user's pre-disposition to injury and/or disease based on the user's activities.

17. The computer program product for providing a process for personalized healthcare related expense investment planning of claim 15, wherein;

the data representing the user's personal health profile data indicating the user's pre-disposition to injury and/or disease based on the user's attitude toward healthcare services utilization.

18. A computer program product for providing a process for personalized healthcare related expense investment planning comprising:

a nontransitory computer readable medium;

and computer program code, encoded on the computer readable medium, comprising computer readable instructions which when executed by a computing processor perform a process comprising:

obtaining personalized health and healthcare related data for a user including historical healthcare utilization data indicating actual historical utilization of at least one healthcare program associated with the user, at least a portion of which is obtained electronically directly from a database coupled to either of a healthcare service provider or healthcare insurance provider computing system, the personalized health and healthcare related data for a user comprising:

data representing the user's general background and demographics;

data representing the user's historical healthcare utilization; and data representing the user's personal health profile, including specific data regarding specific high-risk sports activities in which the user engages;

analyzing the personalized health and healthcare related data for the user to determine predicted healthcare services that the user is likely to utilize during a defined timeframe, the analysis including consideration of one or more potential injuries predicted to occur based on the specific data regarding specific high-risk sports activities in which the user engages;

defining one or more healthcare programs to be utilized by the user during the defined timeframe;

calculating the user's cost of the predicted healthcare services under the chosen one or more healthcare programs; and developing an investment plan for the user, the investment plan for the user being based, at least in part, on the user's cost of the predicted healthcare services.

19. A system for providing personalized healthcare related expense investment planning comprising:

a processor for executing a process for personalized healthcare related expense investment planning, the process for personalized healthcare related expense investment planning comprising:

defining a timeframe during which healthcare services will be paid;

obtaining personalized health and healthcare related data for a user including historical healthcare utilization data indicating actual historical utilization of at least one healthcare program associated with the user, at least a portion of which is obtained electronically directly from a database coupled to either of a healthcare service provider or healthcare insurance provider computing system, the personalized health and healthcare related data for the user including specific data regarding specific high-risk sports activities in which the user engages;

analyzing the personalized health and healthcare related data for the user to determine predicted healthcare services that the user is likely to utilize during the defined timeframe, the analysis including consideration of one or more potential injuries predicted to occur based on the specific data regarding specific high-risk sports activities in which the user engages;

choosing one or more healthcare programs to be utilized by the user during the defined timeframe;

determining the user's cost of the predicted healthcare services under the chosen one or more healthcare programs; and developing an investment plan for the user, the investment plan for the user being based, at least in part, on the user's cost of the predicted healthcare services.

20. The system for providing personalized healthcare related expense investment planning of claim 19, wherein; the timeframe defined at defining a timeframe during which healthcare services will be paid is the remainder of the user's working years.

21. The system for providing personalized healthcare related expense investment planning of claim 19, wherein; the timeframe defined at defining a timeframe during which healthcare services will be paid is the remainder of the user's life.

22. The system for providing personalized healthcare related expense investment planning of claim 21, wherein; the chosen one or more healthcare programs includes both an employer sponsored healthcare program and a government sponsored healthcare program.

23. The system for providing personalized healthcare related expense investment planning of claim 19, wherein; the user's historical healthcare utilization data includes data indicating the user's inclination to utilize preventative/maintenance healthcare services.

24. The system for providing personalized healthcare related expense investment planning of claim 19, wherein; obtaining personalized health and healthcare related data for a user comprises obtaining data representing the user's personal health profile.

25. The system for providing personalized healthcare related expense investment planning of claim 24, wherein; the data representing the user's personal health profile includes data indicating the user's pre-disposition to injury and/or disease based on the user's activities.

26. The system for providing personalized healthcare related expense investment planning of claim 24, wherein; the data representing the user's personal health profile includes data indicating the user's pre-disposition to injury and/or disease based on the user's attitude toward healthcare services utilization.

27. A computer program product for providing a process for personalized healthcare related expense investment planning comprising:

a nontransitory computer readable medium;

and computer program code, encoded on the nontransitory computer readable medium, comprising computer readable instructions which when executed by a computing processor perform a process comprising:

defining a timeframe during which healthcare services will be paid;

obtaining personalized health and healthcare related data for a user including historical healthcare utilization data indicating actual historical utilization of at least one healthcare program associated with the user, at least a portion of which is obtained electronically directly from a database coupled to either of a healthcare service provider or healthcare insurance provider computing system, the personalized health and healthcare related data for a user comprising:

data representing the user's general background and demographics;

data representing the user's historical healthcare utilization; and data representing the user's personal health profile, including specific data regarding specific high-risk sports activities in which the user engages;

analyzing the personalized health and healthcare related data for the user to determine predicted healthcare services that the user is likely to utilize during the defined timeframe, the analysis including consideration of one or more potential injuries predicted to occur based on the specific data regarding specific high-risk sports activities in which the user engages;

choosing one or more healthcare programs to be utilized by the user during the defined timeframe;

determining the user's cost of the predicted healthcare services under the chosen one or more healthcare programs; and developing an investment plan for the user, the investment plan for the user being based, at least in part, on the user's cost of the predicted healthcare services.

* * * * *

UNITED STATES PATENT AND TRADEMARK OFFICE
CERTIFICATE OF CORRECTION

PATENT NO. : 8,930,205 B1
APPLICATION NO. : 11/740232
DATED : January 6, 2015
INVENTOR(S) : Michael S. Klieman et al.

It is certified that error appears in the above-identified patent and that said Letters Patent is hereby corrected as shown below:

In the Claims

In Column 23, Line 54, Claim 1, replace "more or more" with --one or more--;
In Column 24, Line 66, Claim 9, replace "more or more" with --one or more--; and
In Column 26, Line 40, Claim 17, between "health profile" and "data", insert --includes--.

Signed and Sealed this
Seventh Day of July, 2015

Michelle K. Lee
*Director of the United States Patent and Trademark Office*